United States Patent
Caldwell et al.

(10) Patent No.: US 11,012,464 B2
(45) Date of Patent: May 18, 2021

(54) NETWORK VULNERABILITY ASSESSMENT

(71) Applicant: SecurityMetrics, Inc., Orem, UT (US)

(72) Inventors: Brad Caldwell, Orem, UT (US); Ken Lawrence, Lehi, UT (US); R. Trent Gundersen, Orem, UT (US)

(73) Assignee: SecurityMetrics, Inc., Orem, UT (US)

( * ) Notice: Subject to any disclaimer, the term of this patent is extended or adjusted under 35 U.S.C. 154(b) by 198 days.

(21) Appl. No.: 16/376,936

(22) Filed: Apr. 5, 2019

(65) Prior Publication Data
US 2020/0186562 A1    Jun. 11, 2020

Related U.S. Application Data

(63) Continuation of application No. 16/215,300, filed on Dec. 10, 2018, now Pat. No. 10,298,611.

(51) Int. Cl.
*H04L 29/06* (2006.01)
*H04W 12/08* (2021.01)

(52) U.S. Cl.
CPC ........ *H04L 63/1433* (2013.01); *H04L 63/029* (2013.01); *H04W 12/0808* (2019.01)

(58) Field of Classification Search
CPC ............. H04L 63/1433; H04L 63/029; H04W 12/0808
See application file for complete search history.

(56) References Cited

U.S. PATENT DOCUMENTS 6,119,165 A * 9/2000 Li ........................... H04L 29/06
                                                              709/218
7,152,105 B2 * 12/2006 McClure ................. H04L 41/12
                                                              709/224

(Continued)

FOREIGN PATENT DOCUMENTS

CN    101369995 A  *  2/2009
GB    2458193 A       9/2009

OTHER PUBLICATIONS

Hopper et al, Feb. 2010, "How Much Anonymity does Network Latency Leak", ACM Trans. Info. System Section 13, 2, Article 13, pp. 1-28.*
U.S. Appl. No. 16/215,300, filed Dec. 10, 2018.
UK Search Report received in related patent application No. GB1905563.1, dated Jun. 7, 2019.

*Primary Examiner* — Jung W Kim
*Assistant Examiner* — Thomas Ho
(74) *Attorney, Agent, or Firm* — Maschoff Brennan Gilmore Israelsen & Wrigh

(57) ABSTRACT

A method to assess network vulnerabilities of devices may include accessing, by a relay device, a network that includes a firewall to separate the network from external networks such that the relay device is coupled to the network from behind the firewall attached to the network. The method may further include establishing a communication channel over a secondary network between the relay device and a monitor system. The method may further include detecting one or more devices behind the firewall attached to the network by the relay device. The method may also include after establishing the communication channel and detecting the one or more devices and while the relay device is coupled to the network from behind the firewall attached to the network, performing, by the monitor system, one or more network vulnerability assessments on the one or more devices via network communications that pass through the relay device.

20 Claims, 5 Drawing Sheets

(56) References Cited

U.S. PATENT DOCUMENTS

| | | | | |
|---|---|---|---|---|
| 7,818,790 B1* | 10/2010 | Burns | ................... | H04L 63/08 |
| | | | | 726/7 |
| 9,100,369 B1 | 8/2015 | Fallows et al. | | |
| 9,608,961 B2* | 3/2017 | Yin | ................... | H04L 63/1425 |
| 2002/0064132 A1* | 5/2002 | Akyol | ................ | H04L 41/0803 |
| | | | | 370/250 |
| 2002/0099958 A1* | 7/2002 | Hrabik | ................ | H04L 63/20 |
| | | | | 726/22 |
| 2002/0145981 A1 | 10/2002 | Klinker et al. | | |
| 2004/0193476 A1* | 9/2004 | Aerdts | ................ | G06Q 10/06 |
| | | | | 705/7.29 |
| 2005/0044418 A1* | 2/2005 | Miliefsky | ........... | H04L 63/1433 |
| | | | | 726/4 |
| 2006/0101516 A1 | 5/2006 | Sudaharan et al. | | |
| 2007/0234061 A1* | 10/2007 | Teo | ................... | G06Q 20/382 |
| | | | | 713/178 |
| 2008/0189769 A1 | 8/2008 | Casado et al. | | |
| 2011/0267952 A1* | 11/2011 | Ko | ................... | H04L 45/70 |
| | | | | 370/237 |
| 2012/0240226 A1 | 9/2012 | Li | | |
| 2015/0264083 A1 | 9/2015 | Prenger et al. | | |
| 2015/0319065 A1* | 11/2015 | Lida | ................ | H04L 65/80 |
| | | | | 709/219 |
| 2016/0028601 A1 | 1/2016 | Berdichevski et al. | | |
| 2017/0054784 A1* | 2/2017 | Panattu | ................ | H04L 65/80 |
| 2017/0359310 A1 | 12/2017 | Jameson et al. | | |
| 2018/0270161 A1* | 9/2018 | Popescu | ............... | H04L 47/283 |

\* cited by examiner

NETWORK VULNERABILITY ASSESSMENT

CROSS-REFERENCE TO RELATED APPLICATION

This application is a continuation of U.S. patent application Ser. No. 16/215,300, filed on Dec. 10, 2018, the disclosure of which is incorporated herein by reference in its entirety.

FIELD

The embodiments discussed herein are related to assessing vulnerabilities.

BACKGROUND

A network vulnerability assessment (VA) may include a process of identifying, and possibly prioritizing, vulnerabilities of an environment. Network vulnerability assessments may be performed on various types of devices, systems, and/or networks, such as one or more computers and/or servers of an information technology (IT) system.

The subject matter claimed herein is not limited to embodiments that solve any disadvantages or that operate only in environments such as those described above. Rather, this background is only provided to illustrate one example technology area where some embodiments described herein may be practiced.

SUMMARY

A method to assess network vulnerabilities of devices may include accessing, by a relay device, a network that includes a firewall to separate the network from external networks such that the relay device is coupled to the network from behind the firewall attached to the network. The method may further include establishing a communication channel over a secondary network between the relay device and a monitor system. The monitor system may be located in front of the firewall attached to the network. The method may further include detecting one or more devices behind the firewall attached to the network by the relay device while the relay device is coupled to the network from behind the firewall attached to the network. The method may also include after establishing the communication channel and detecting the one or more devices and while the relay device is coupled to the network from behind the firewall attached to the network, performing, by the monitor system, one or more network vulnerability assessments on the one or more devices via network communications that pass through the relay device, the network, and the communication channel on the secondary network.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
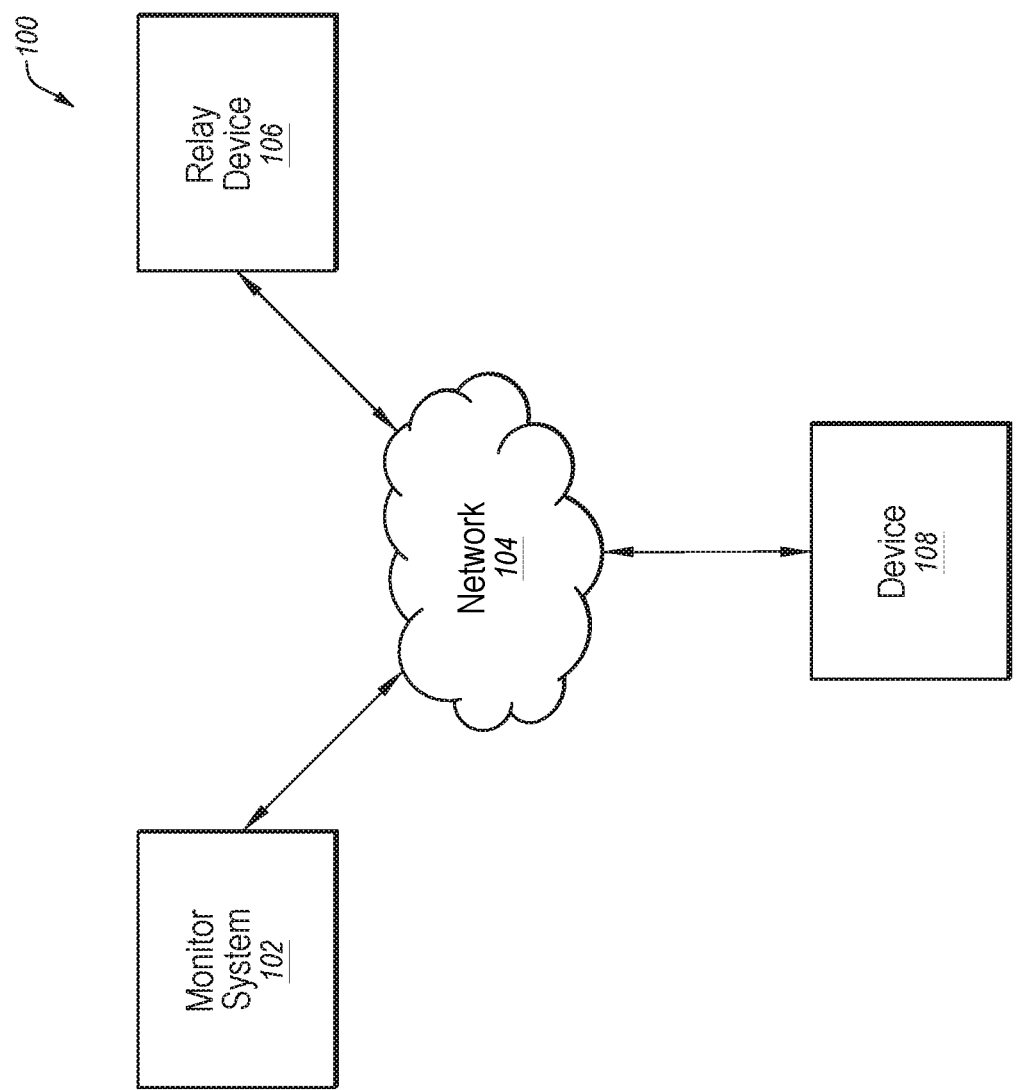
FIG. 1 illustrates an example environment that may be used to assess network vulnerabilities of devices.

Some embodiments in this disclosure relate to assessing vulnerabilities of a network and/or one or more devices (e.g., computers, mobile devices, telecommunications equipment, printers, cameras, etc.) of the network. In some embodiments, a network vulnerability assessment may be performed on devices on the network by a monitor system that is communicatively coupled to the network independent of a firewall attached to the network.

Conventionally, to enhance operations and/or simplify activities, many entities (e.g., businesses and/or individuals) utilize computer systems including software and computing and/or networking devices (e.g., computers, telecommunications equipment, networking equipment, etc.). However, many computer systems (e.g., software/applications) may be subject to security vulnerabilities that may result in a device and/or an entity being compromised (e.g., breach of confidentiality, theft of data, etc.).

Some conventional systems may perform a network vulnerability assessment on one or more devices of a network through a firewall attached to the network. However, in these conventional systems, all information (e.g., data and control information) is routed through the firewall, which may reject data and/or may be hard to calibrate due to network latency. Thus, problems transmitting data through the firewall (e.g., to one or more computers, to a server, etc.) may exist.

In some embodiments, vulnerabilities of devices of a network may be assessed via a monitor system and a relay device. In at least some embodiments, in contrast to conventional systems, the monitor system may communicate with the one or more devices of the network via the relay device and independent of a firewall attached to the network.

In these and other embodiments, the relay device, which may include, for example, a mobile device, may be communicatively coupled with the network via a first network, such as a wireless network (e.g., an 802.11 network, such as a Wi-Fi network), a wired network, or a combination thereof. Further, in some embodiments, the relay device may be communicatively coupled with the monitor system via a second network, such as a wireless network (e.g., a cellular or mobile data network, such as a Long Term Evolution (LTE) network, 5G, 4G, 3G, or any other cellular or mobile data network), a wired network, or a combination thereof. Thus, communications for the network vulnerability assessment may be transmitted between the monitor system and the one or more devices of the network via the relay device and the first and second networks.

In some embodiments, the network latency of the first and second networks may vary. In these and other embodiments, the relay device may be configured to obtain a network latency of the first and second networks. The relay device may provide the network latency of the first and second networks to the monitor system. The monitor system may adjust the network vulnerability assessment of the devices based on the network latency of the first and second networks. In some embodiments, an encrypted connection (e.g., a secure network tunnel such as a virtual private network (VPN)) between the monitor system and the relay device may be established through which communications for the network vulnerability assessment may occur.

In short, in some embodiments, a monitor system may communicatively couple to and may assess vulnerabilities of devices of a network via a relay device and independent of a firewall attached to the network.

Accordingly, various embodiments described in this disclosure set forth a technical solution to a technological problem with respect to network vulnerability assessment of devices. The technological problem outlined herein regarding transmitting data through a firewall (e.g., to perform network vulnerability assessment) did not exist before computer technology and is directly related to computer technology. The various embodiments described herein set forth a technical solution to the technical problem that requires implementation by a computer or computer system. The technical solution may include, for example, accessing a network by a relay device, behind the firewall attached to the network, and assessing vulnerabilities of devices of the network via the relay device and independent of the firewall. Alternatively or additionally, the systems and methods described in this disclosure may solve other technological problems and provide other technical solutions.

Furthermore, the systems and methods described in this disclosure are at least in the technological field of computer networks, in particular the technological field with respect to network security. The systems and methods described in this disclosure may be relevant and useful in other technological fields as well.

Embodiments of the present disclosure will be explained with reference to the accompanying drawings.

FIG. 1 illustrates an example environment 100, which may be used to assess network vulnerabilities of devices. Environment 100 may be arranged in accordance with at least one embodiment described in the present disclosure. Environment 100 may include a monitor system 102, a network 104, a relay device 106, and device 108.

Network 104 may be configured to communicatively couple monitor system 102, relay device 106, and/or device 108. In some embodiments, network 104 may include any network or configuration of networks (e.g., network 204 and/or network 208 of FIG. 2) configured to send and receive communications between systems and devices. In some embodiments, network 104 may include a wired network, an optical network, and/or a wireless network, and may have numerous different configurations. Network 104 may include one or more devices configured to allow communications between monitor system 102, relay device 106, and/or device 108.

Device 108, which may include, for example one or more devices of a network (e.g., a corporate network), may include any electronic or digital computing device. As non-limiting examples, device 108 may include a desktop computer, a server, networked computers, a laptop computer, a smartphone, a mobile phone, a tablet computer, a printer, a camera, or any other electronic device.

Relay device 106 may include any electronic or digital computing device and may include at least memory and a processor. The memory may include computer-readable instructions that when executed by the processor may cause or direct relay device 106 to perform operations as described in this disclosure. For example, relay device 106 may include a desktop computer, a server, networked computers, a laptop computer, a smartphone, a mobile phone, a tablet computer, smart watch or other smart wearable, or any other computing device that may be used to access (e.g., communicate with) another device.

According to various embodiments of the present disclosure, relay device 106 may be authenticated to establish a communication link with device 108 over the network 104. For example, relay device 106 may provide a known access code to a network such that the network grants access to relay device 106. By granting access to relay device 106, relay device 106 may join network 104 behind a firewall attached to network 104. Relay device 106 being behind the firewall attached to network 104 may include relay device 106 being able to communicate with other devices, such as device 108 on the network without communications between relay device 106 and the other devices being subject to inspection, passing through, or otherwise being affected by the firewall.

In some embodiments, after being granted access, relay device 106 may provide further authentication to be granted access by a network controller, such as a user name and password. As another example, a MAC address or other identifier of relay device 106 may be provided to the network and indicated as an authenticated device. Alternatively or additionally, relay device 106 may be authenticated using a synchronous or asynchronous encryption methodology. For example, in some embodiments, the encryption methodology may incorporate public keys and private keys, such as SSL certificates or other types of certificates. In these and other embodiments, relay device 106 may use an obtained password to retrieve a private-key. Relay device 106 may use the private-key to generate a digital signature that may be provided to device 108 along with a certificate. Device 108 may authenticate relay device 106 using the digital signature and the certificate. Any one or more of the concepts discussed in this disclosure as well as other authentication concepts may be deployed to authenticate relay device 106.

Monitor system 102 may include any electronic or digital computing device and/or system (e.g., a backend system). In some embodiments, monitor system 102 may include one or more servers. In these and other embodiments, monitor system 102 may include at least a memory and a processor. The memory may include instructions that when executed by the processor may cause or direct monitor system 102 to perform operations as described in this disclosure, among other operations. Monitor system 102 may be configured to establish a communication link with relay device 106. In some embodiments, relay device 106 may detect device 108 and broker a connection between monitor system 102 and device 108. Further, monitor system 102, which may include one or more network vulnerability assessment tools (e.g., a scanning and analysis tool), may be configured to perform one or more network vulnerability assessments of device 108.

Modifications, additions, or omissions may be made to the environment 100 without departing from the scope of the present disclosure.

Figure 2:
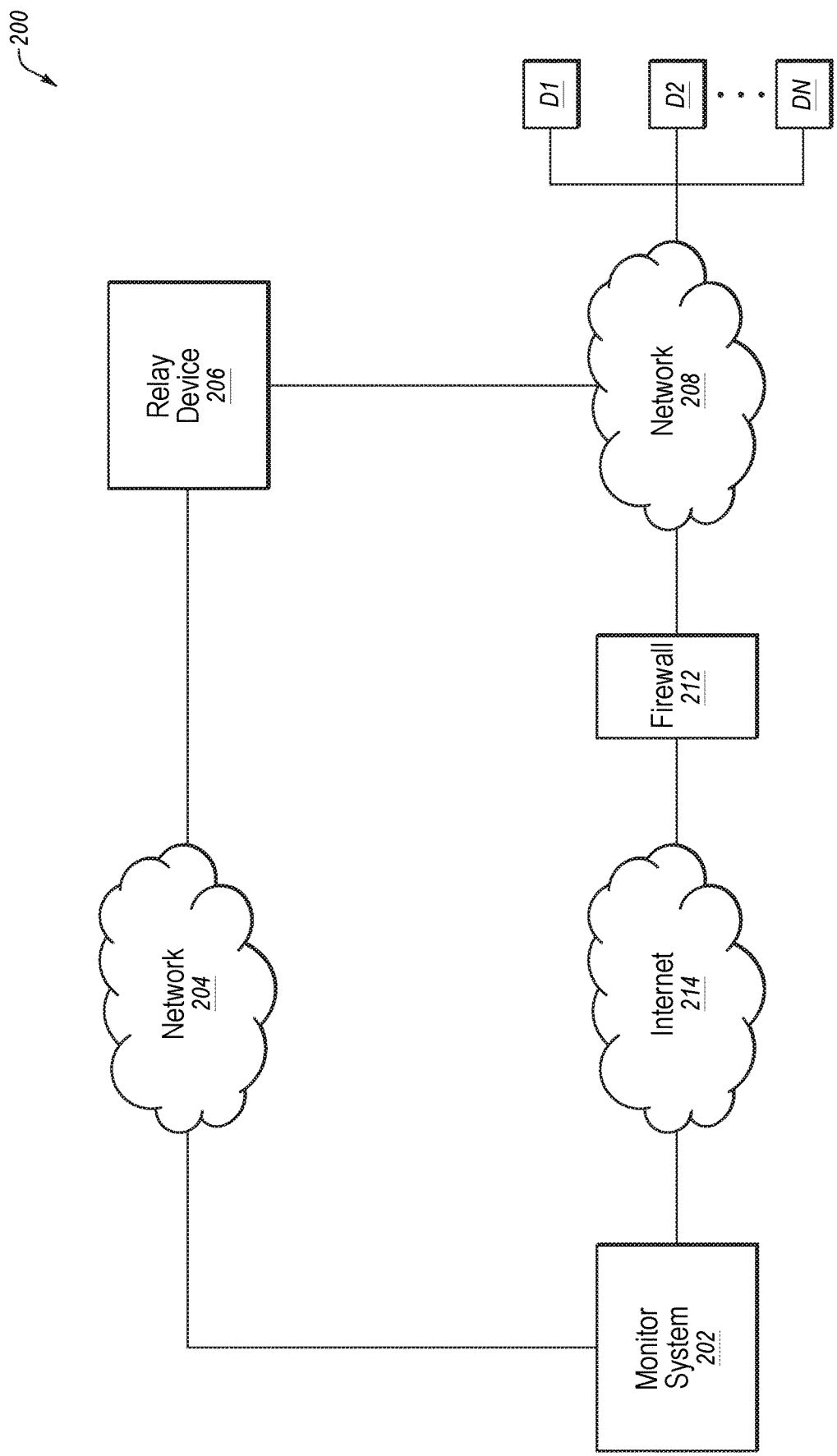
FIG. 2 illustrates another example environment that may be used to assess network vulnerabilities of devices.

FIG. 2 depicts an example environment 200 arranged in accordance with at least one embodiment described in the present disclosure. Environment 200 may include a monitor system 202, a network 204, a relay device 206, and a network 208. As illustrated, network 208, which may include a secure network, may include one or more devices (e.g., devices D1-DN). In some embodiments, monitor system 202 may include a server, and may also be referred to herein as a "monitoring server." For example, monitor system 202 may include monitor system 102 of FIG. 1, and relay device 206 may include relay device 106 of FIG. 1. Further, device 108 of FIG. 1 may include devices D1-DN on network 208.

Further, in some embodiments, network 208 may include a firewall 212. Firewall 212 may be configured to restrict, prevent, and/or to monitor access to network 208 from devices in front of firewall 212. For example, as illustrated, firewall 212 may prevent or restrict devices, such as monitor system 202 from accessing network 208 through Internet 214. As such, monitor system 202 may be located in front of firewall 212. As another example, firewall 212 may restrict network communications that may be communicated by devices, such as monitor system 202, to the devices D1-DN on network 208.

In these and other embodiments, firewall 212 may be configured to separate network traffic. One classification of network traffic is referred to as LAN (Local Area Network) traffic and WAN (Wide Area Network) traffic. In these and other embodiments, the Internet 214 may be a WAN and network 208 may be a LAN. Firewall 212 may include a WAN side for interfacing with Internet 214 and for handling network traffic in front of firewall 212 and a LAN side for interfacing with network 208 and for handling network traffic behind firewall 212. As used in this disclosure, the phrase "behind the firewall" may refer to the local area network or LAN side of firewall 212. The phrase "in front of the firewall" may refer to the wide area network or WAN side of firewall 212.

In some embodiments, network 204 and/or network 208 may include any network or configuration of networks configured to send and receive communications between systems and devices. In some embodiments, network 204 and/or network 208 may include a wired network, an optical network, and/or a wireless network, and may have numerous different configurations. Network 204 and/or network 208 may include one or more devices configured to allow communications between monitor system 202 and relay device 206, between relay device 206 and devices D1-DN, and/or between monitor system 202 and devices D1-DN. For example, network 204 may include a wireless data communication network, such as an LTE network, 5G, 4G, 3G, or any other cellular or mobile data network. In these and other embodiments, network 208 may include a local area network (LAN). In these and other embodiments, network 208 may include wireless and wired connection ports. For example, network 208 may include a wireless access point through an 802.11 protocol such as Wi-Fi® and/or wired access points through Ethernet ports, among other types of wired access points.

Each device D1-DN may be part of network 208 such that each device D1-DN may be a networked device. For example, devices D1-DN may be accessed by way of the network 208 and devices D1-DN may be discovered by other devices that are part of network 208. Alternatively or additionally, each device D1-DN may be behind firewall 212 of network 208. In these and other embodiments, each device D1-DN being behind firewall 212 may indicate that devices D1-DN may be able to communicate with another of devices D1-DN and relay device 206 on network 208 without communications being subject to inspection, passing through, or otherwise being affected by firewall 212. In some embodiments, each device D1-DN may include a desktop computer, a server, a laptop computer, a smartphone, a mobile phone, a tablet computer, a printer, a camera, or any other electronic device that is included as part of network 208.

In some embodiments, relay device 206 may be granted authenticated access to network 208. For example, relay device 206 may be authenticated to establish a communication link with network 208. For example, relay device 206 may be brought into the location associated with the network 208 such that relay device 206 may directly access the network 208 independent of the firewall 212. For example, relay device 206 may be a mobile device such as a mobile phone. Relay device 206 may be brought to a location that includes a direct wireless access point to network 208. For example, relay device 206 may be brought to a location that includes a wireless access point that grants direct wireless access to the network 208. Relay device 206 may be authenticated and allowed to join network 208 through the wireless access point. After being authenticated, relay device 206 may be an authorized device on network 208 such that relay device 206 is coupled to network 208 from behind firewall 212 attached to network 208. As an authorized device, relay device 206 may be able to discover and communicate with devices D1-DN that are also on network 208 without communications passing through firewall 212.

In some embodiments, a communication link (e.g., a cellular communication link or mobile data communication link) may be established between relay device 206 and monitor system 202 through network 204. The communication link may be separate from the communication link between relay device 206 and network 208. For example, the communication link between relay device 206 and monitor system 202 may be established through a cellular communication link through network 204 and the communication link between relay device 206 and network 208 may be established through an 802.11 wireless communication link through network 208. In some embodiments, the communication link between relay device 206 and monitor system 202 and the communication link between relay device 206 and network 208 may include the same type of communication links. For example, each communication link may include an 802.11 type wireless communication link. In these and other embodiments, while network 204 and network 208 may be the same type of networks, network 204 and network 208 may be separate networks.

In some embodiments, through the communication links of relay device 206, monitor system 202 may be communicatively coupled to network 208. For example, monitor system 202 may send communications to relay device 206 over network 204 and relay device 206 may relay the communications to network 208. Thus, in these and other embodiments, monitor system 202 may establish communication with a device on network 208 through relay device 206. In these and other embodiments, communications between the device on network 208 and monitor system 202 through relay device 206 may not be subject to firewall 212. As a result, the communications may be independent of firewall 212 and thus not affected by firewall 212.

In some embodiments, monitor system 202 may be communicatively coupled to relay device 206 through a secure connection. The secure connection may include a secure network tunnel, such as a virtual private network (VPN) among other types of secure network tunnels. The secure network tunnel may be implemented using different types of connections, including a transport layer security (TLS) connection and a secure sockets layer (SSL) connection, among other types of secure connections.

In some embodiments, after relay device 206 joins network 208, relay device 206 may detect one or more devices (e.g., devices D1-DN) on network 208. In these and other embodiments, one or more devices (e.g., one of more of devices D1-DN) on network 208 may be detected via any known and suitable device discovery processes. For example, one or more devices (e.g., one of more of devices D1-DN) on network 208 may be detected by relay device 206 via a simple network management protocol (SNMP), active probes, pings, or any other device discovery protocol.

In some embodiments, after discovering the devices on network 208, relay device 206 may provide an indication of the devices to monitor system 202. For example, relay device 206 may provide network addresses of the devices on network 208 to monitor system 202.

In these and other embodiments, monitor system 202 may communicate with the devices on network 208 by sending communications to the network address of the devices via network 204, relay device 206, and network 208. Thus, monitor system 202 may communicate with the devices on network 208 via relay device 206 and independent of firewall 212 of network 208 or other firewalls of network 208 that control and/or monitor network traffic into and out of network 208. In short, the communication link between relay device 206 and network 208 and the communication link between relay device 206 and monitor system 202 provide a communication link between monitor system 202 and the devices D1-DN on network 208, that bypasses or does not pass through firewall 212 while still allowing monitor system 202 to communicate with the devices D1-DN. By allowing monitor system 202 to communicate with the devices D1-DN independent of firewalls, the environment 200 may reduce or avoid potential problems with firewalls altering or monitoring network traffic between monitor system 202 and the devices D1-DN.

In some embodiments, depending on network bandwidth (e.g. a bandwidth of network 204 and/or a bandwidth of network 208), monitor system 202 may communicate with one or more of the devices D1-DN during overlapping time periods. For example, if network bandwidth is sufficient, a connection between monitor system 202 and a first device on network 208 may be established and during an overlapping time period a second connection between monitor system 202 and a second device on network 208 may be established. If network bandwidth is limited, a first connection between monitor system 202 and the first device may be established at a first time and a second connection between monitor system 202 and the device may be established a second time that occurs after the first connection is terminated.

In some embodiments, monitor system 202 may perform one or more known network vulnerability assessments on the devices on network 208 with which monitor system 202 establishes a connection. For example, monitor system 202 may include one or more network vulnerability assessment software tools. The network vulnerability assessment software tools may include a vulnerability scanning tool, an analysis tool, a network mapper, and a penetration tool, among other network vulnerability assessment software tools. Monitor system 202 may perform one or more network-based scans, one or more host-based scans, one or more wireless scans, one or more application scans, one or more database scans, and one or more penetration tests, among other scans, or any combination thereof on the devices on network 208. In these and other embodiments, the scans of the network vulnerability assessment may be performed via network communications between the devices on network 208 and monitor system 202. The network communications between the devices on network 208 and monitor system 202 may pass through network 204, relay device 206, and network 208.

In some embodiments, monitor system 202 may ping the devices on network 208 to determine the availability of the device for a network vulnerability assessment. If responses from the devices are received by monitor system 202 within a particular time frame, the devices may be considered available for network vulnerability assessment. If responses from the devices are not received by monitor system 202 within the particular time frame, the devices may be considered unavailable. In some circumstances, due to network conditions between monitor system 202 and the devices on network 208 along the communication links between monitor system 202 and relay device 206 and relay device 206 and the devices of network 208, a time for devices to receive the ping from monitor system 202 and a time for monitor system 202 to receive a response from the devices may vary.

For example, a first device may be available. Under a first set of network conditions the transmission time for the ping to arrive at the first device and a response to return to monitor system 202 may be T1. Under a second set of network conditions, the transmission time for the ping to arrive at the first device and a response to return to monitor system 202 may be T2. However, the particular time period used by monitor system 202 may be T3, where T1>T3>T2. Thus, under the first set of network conditions, monitor system 202 may determine the first device is unavailable when the first device is actually available due to the different transmission times of the ping and response and not due to processing time of the first device. Monitor system 202 determining a device is unavailable when the first device is actually available may be referred to in this disclosure as a false negative.

Alternatively or additionally to pinging devices to determine availability of devices, individual ports on the devices may be probed to determine whether the ports are open or closed. When a port is open, the port may be probed to determine if the port includes one or more network vulnerabilities. Probing the port may include scanning or testing the port to determine if the port is providing data that it should not be providing. When a port is providing data that it should not be providing, the port may be considered as a network vulnerability.

Similar to pinging a device, a port may be required to provide a response within a particular time period after the port is probed. If the port does not respond with in the particular time period, the port may be determined to be closed. Due to changing network conditions, however, monitor system 202 may determine a port is closed even when the port is open because a request and response may be delayed more than the particular time period, thus resulting in false negatives as discussed above.

In some embodiments, to help to reduce false negatives the particular time frame may be increased to a time value large enough to account for most reasonable delays due to network conditions. In some embodiments, to help to reduce false negatives, the particular time frame used by monitor system 202 during the network vulnerability assessment to determine if a device is available or a port is open may be adjusted. In these and other embodiments, the particular time frame may be adjusted based on a transmission time/network latency between monitor system 202 and relay device 206 and/or a transmission time/network latency between relay device 206 and the devices on network 208.

In these and other embodiments, at least one network latency of environment 200 may be determined. In some embodiments, the network latency may be determined by relay device 206. For example, in some embodiments, a first network latency (e.g., a network latency L1) between relay device 206 and monitor system 202 may be determined. The first network latency may be determined by relay device 206 by sending a ping or other network request to monitor system 202. Relay device 206 may receive a response from monitor system 202 in response to sending the ping or network request. The first network latency may be a time between sending the request by relay device 206 and receiving the response by relay device 206.

Further, in some embodiments, a second network latency (e.g., a network latency L2) between relay device 206 and a device on network 208 may be determined. The second network latency may be determined by relay device 206 by sending a ping or other network request to the device on network 208. Relay device 206 may receive a response from the device in response to sending of the ping or network request. The second network latency may be a time between sending the request by relay device 206 and receiving the response by relay device 206.

Further, a total network latency (e.g., a total network latency LT), which may be the sum of the latency between relay device 206 and monitor system 202 and the latency between relay device 206 and one or more of devices D1-DN, may be determined (e.g., total latency LT=latency L1+latency L2).

In some embodiments, network latency of environment 200 may change due to network conditions and/or other factors. In these and other embodiments, network latency may be monitored. Monitoring of network latency may include determining and/or recalculating network latency periodically at random, set, pseudo-random, or other intervals, in response to a change in network conditions, and/or in response to one or more events, such as a request from monitor system 202. Alternatively or additionally, network latency may be determined and/or recalculated after each network vulnerability assessment of a port of a device, or of a group of devices, after network vulnerability assessments of N number of ports of a device, of M number of devices, or of L number of groups of devices, after a number of ports are consecutively or cumulatively discovered open and/or closed either for a single device or across multiple devices, after a given time period, etc.

In some embodiments, network latency may be provided to monitor system 202 from relay device 206. As discussed above, the network latency, such as the first network latency, the second network latency, and/or the total network latency, may be used to modify network vulnerability assessments. For example, the network latency for a first port may be used in network vulnerability assessments for other ports of the same device, across different devices, or across different groups of devices based on a network configuration of the devices.

Alternatively or additionally, network latencies from relay device 206 may be obtained for each port, group of ports, device, or group of devices when monitor system 202 performs network vulnerability assessments with respect to different ports, groups of ports, devices, or groups of devices. For example, monitor system 202 may use a first total network latency for a first port of a first device for network vulnerability assessment of the first port. Monitor system 202 may obtain and use a second total network latency for a second port of the first device for network vulnerability assessments of the second port.

Alternatively or additionally, monitor system 202 may use a combination of network latencies for different ports, devices, or groups of devices. For example, monitor system 202 may obtain a first network latency between monitor system 202 and relay device 206 and a second network latency between relay device 206 and a first device of network 208. Monitor system 202 may use a combination of the first and second network latencies for the network vulnerability assessment of the first device. Monitor system 202 may obtain an updated first network latency. Monitor system 202 may use a combination of the updated first network latency and the second network latency for the network vulnerability assessments of a second device of network 208.

Alternatively or additionally, monitor system 202 may use a set network latency for the network latency between relay device 206 and devices of network 208. The set network latency may be provided by relay device 206 based on a determined network latency for network 208. Alternatively or additionally, the set network latency may be a particular network latency that may be used for multiple different networks. In these and other embodiments, monitor system 202 may receive a network latency from relay device 206 of the network latency between monitor system 202 and relay device 206 and use the received network latency in combination with the set network latency for network vulnerability assessments.

Alternatively or additionally, monitor system 202 may determine the network latency between relay device 206 and monitor system 202 and use the determined network latency in combination with the set network latency for network vulnerability assessments. Alternatively or additionally, monitor system 202 may determine the network latency between relay device 206 and monitor system 202 and use the determined network latency in combination with a network latency provided by relay device 206 for network vulnerability assessments. Alternatively or additionally, monitor system 202 may determine the network latency between relay device 206 and monitor system 202 and use the determined network latency in combination with a network latency provided by a device of network 208 for network vulnerability assessments.

In some embodiments, monitor system 202 may change the network vulnerability assessments in response to receiving a network latency or total network latency from relay device 206. In these and other embodiments, relay device 206 may monitor the network latency between the monitor system 202 and devices on network 208 and provided updated network latencies to monitor system 202.

In some embodiments, relay device 206 may provide updated network latencies to monitor system 202 in response to a difference between a current network latency and a network latency previously provided to monitor system 202 being greater than a threshold latency. In these and other embodiments, the threshold latency may be based on the configuration of the network vulnerability assessments performed by monitor system 202. Alternatively or additionally, the threshold latency may vary based on the network latency previously provided to monitor system 202. Alternatively or additionally, monitor system 202 may change the network vulnerability assessments in response to determining an update network latency or in response to determining an updated network latency that varies from a previous network latency more than the threshold latency.

In some embodiments, monitor system 202 may send a request to relay device 206 for a network latency. For example, in response to changing ports, devices, or groups of devices for network vulnerability assessments, monitor system 202 may request a network latency. In response to the request, relay device 206 may send a network latency. In these and other embodiments, relay device 206 may obtain an updated network latency to send in response to the request or send a previous network latency.

In some embodiments, monitor system 202 may adjust the network vulnerability assessment based on every received network latency or based on a schedule of received network latencies. For example, monitor system 202 may adjust the network vulnerability assessment based on a moving average, medium, or some other combination of more than one network latencies.

In some embodiments, monitor system 202 may adjust the network vulnerability assessment using a first network latency between monitor system 202 and relay device 206, a second network latency between relay device 206 and the devices of network 208, or a combination of the first and second network latencies.

In some embodiments, monitor system 202 may adjust the network vulnerability assessment by adjusting a particular time period used to determine a status of a port or an availability of a device. In these and other embodiments, the availability of the device may be available or unavailable and the status of the port may be open or closed.

Modifications, additions, or omissions may be made to environment 200 without departing from the scope of the present disclosure. For example, environment 200 may include additional networks with additional firewalls. In these and other embodiments, environment 200 may include a separate relay device of each of the additional network and firewalls, such that each network is accessed by a relay device. Alternatively or additionally, environment 200 may include multiple relay devices. In these and other embodiments, the relay devices may coordinate discovery of and relaying network vulnerability assessments communications to devices of network 208. For example, through coordination of the relay devices, network vulnerability assessments of some of the devices of network 208 may be performed through a first relay device and network vulnerability assessments of other of the devices of network 208 may be performed through a second relay device.

Figure 3:
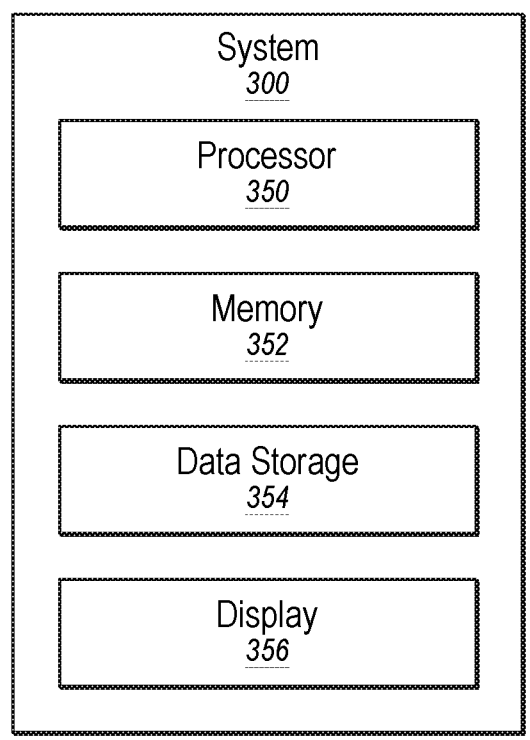
FIG. 3 illustrates an example system that may be used during assessment of network vulnerabilities of devices.

FIG. 3 illustrates an example system 300 that may be used during assessment of network vulnerabilities of devices. System 300 may be configured according to at least one embodiment of the present disclosure and may be configured to perform one or more operations related to network vulnerability assessments. System 300 may include a processor 350, a memory 352, a data storage 354, and a display 356. Processor 350, memory 352, data storage 354, and display 356 may be communicatively coupled.

In general, processor 350 may include any suitable special-purpose or general-purpose computer, computing entity, or processing device including various computer hardware or software modules and may be configured to execute instructions stored on any applicable computer-readable storage media. For example, the processor 350 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 3, processor 350 may include any number of processors configured to, individually or collectively, perform or direct performance of any number of operations described in the present disclosure. Additionally, one or more of the processors may be present on one or more different electronic devices, such as different servers.

In some embodiments, processor 350 may be configured to interpret and/or execute program instructions and/or process data stored in memory 352, data storage 354, or memory 352 and data storage 354. In some embodiments, processor 350 may fetch program instructions from data storage 354 and load the program instructions in memory 352. After the program instructions are loaded into memory 352, processor 350 may execute the program instructions.

For example, in some embodiments, system 300 may be part of monitor system 102 or monitor system 202 (see FIGS. 1 and 2). For example, system 300 may be part of relay device 206 of FIG. 2. In these and other embodiments, system 300 may be configured to detect one or more devices of a network, establish communication links, and determine network latencies, among other operations. As another example, the system 300 may be part of monitor system 202 of FIG. 2. In these and other embodiments, system 300 may be configured to perform a network vulnerability assessment of a device of network 208 using network latencies.

Memory 352 and data storage 354 may include computer-readable storage media for carrying or having computer-executable instructions or data structures stored thereon. Such computer-readable storage media may include any available media that may be accessed by a general-purpose or special-purpose computer, such as processor 350. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. In these and other embodiments, the term "non-transitory" as explained in the present disclosure should be construed to exclude only those types of transitory media that were found to fall outside the scope of patentable subject matter in the Federal Circuit decision of *In re Nuijten,* 500 F.3d 1346 (Fed. Cir. 2007). Combinations of the above may also be included within the scope of computer-readable media.

The display 356 may be configured as one or more displays that present images, words, etc., as an LCD, LED, projector, or other type of display. The display 356 may be configured to present video, text captions, user interfaces, and other data as directed by the processor 350.

Modifications, additions, or omissions may be made to system 300 without departing from the scope of the present disclosure. For example, in some embodiments, system 300 may include any number of other components that may not be explicitly illustrated or described.

Figure 4:
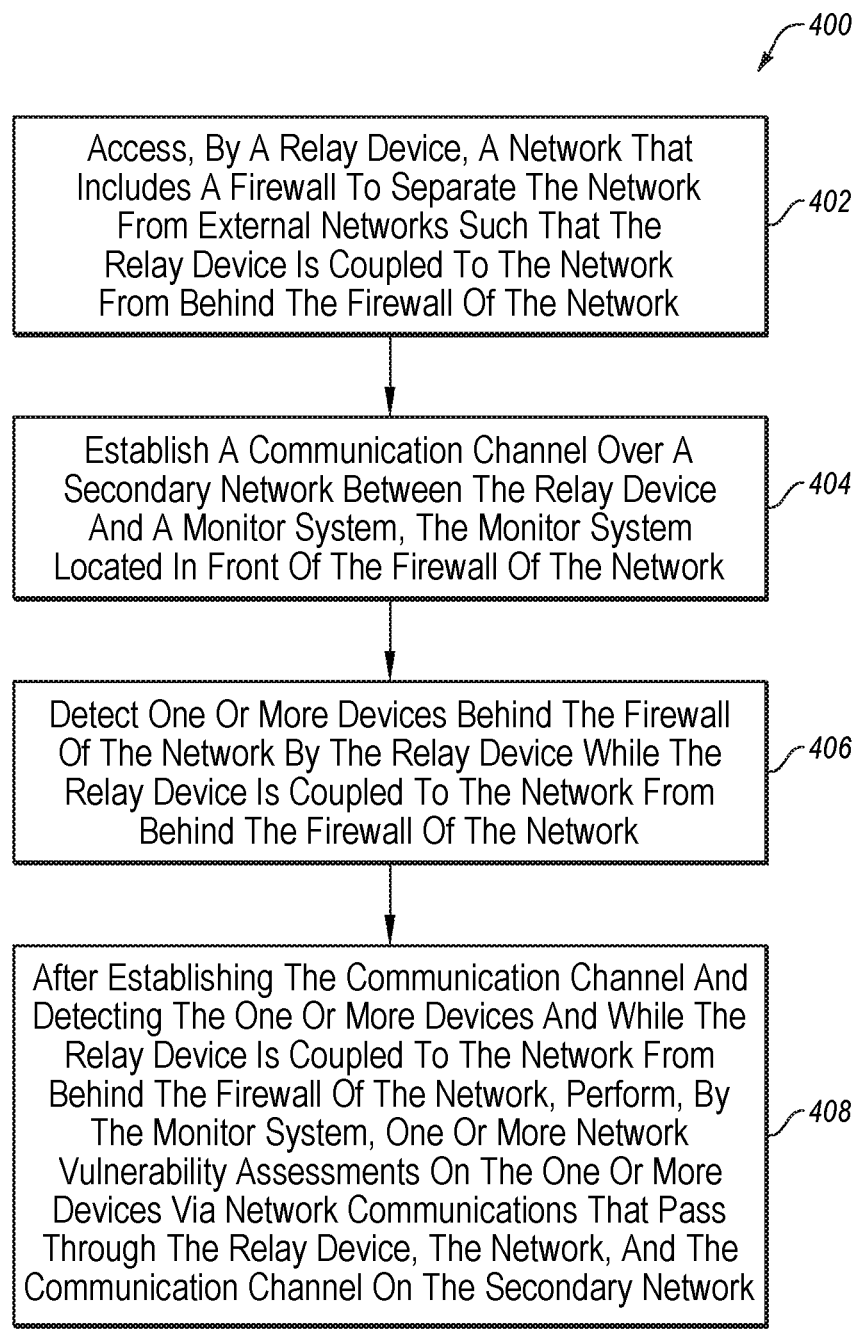
FIG. 4 is a flowchart of an example method to assess network vulnerabilities of devices.

FIG. 4 is a flowchart of an example method 400 to assess network vulnerabilities of devices. Method 400 may be arranged in accordance with at least one embodiment described in the present disclosure. Method 400 may be performed, in some embodiments, by a device or system, such as monitor system 102 and/or relay device 106 of FIG. 1, monitor system 202 and/or relay device 206 of FIG. 2, system 300 of FIG. 3, or another device. In these and other embodiments, method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

Method 400 may begin at block 402, where a network that includes a firewall to separate the network from external networks may be accessed by the relay device such that the relay device is coupled to the network from behind the firewall attached to the network.

For example, the relay device may access the network by being authenticated by the network such that the device is an authenticated device that is coupled to the network from behind the firewall attached to the network. For example, the relay device may include relay device 106 of FIG. 1 or relay device 206 of FIG. 2, and the network, which may include a secure network, may include network 208 of FIG. 2. In some embodiments, the relay device, which may include a mobile device, may be authenticated to access network 208 of FIG. 2, which may include, for example, a local area network (LAN) (e.g., a Wi-Fi network).

At block 404, a communication channel may be established over a secondary network between the relay device and a monitor system. The monitor system may be located in front of the firewall attached to the network. In some embodiments, establishing the communication channel over the secondary network between the relay device and the monitor system may include establishing a wireless data communication channel over a wireless network between the relay device and the monitor system. In these and other embodiments, the wireless network may be separate from the network. For example, with reference to FIG. 2, a communication link between monitor system 202 and relay device 206 may be established where monitor system 202 may be communicatively coupled to relay device 206 via network 204, which may include, for example, a mobile data network.

At block 406, one or more devices behind the firewall attached to the network may be detected by the relay device while the relay device is coupled to the network from behind the firewall attached to the network.

For example, the relay device 206 of FIG. 2 may detect one or more devices (e.g., one or more of devices D1-DN) of network 208. The one or more devices may be detected via any known and suitable device discovery process.

At block 408, after establishing the communication channel and detecting the one or more devices and while the relay device is coupled to the network from behind the firewall attached to the network, one or more network vulnerability assessments may be performed by the monitor system on the one or more devices via network communications that pass through the relay device, the network, and the communication channel on the secondary network. In some embodiments, the network communications of the one or more network vulnerability assessments may not pass through the firewall attached to the network.

For example, with reference again to FIG. 2, monitor system 202 may perform network vulnerability assessments of the one or more devices (e.g., device D1) via relay device 206, network 208, and network 204. The communications of the network vulnerability assessments between monitor system 202 and the one or more devices may bypass firewall 212. As a result, monitor system 202 may be communicatively coupled to network 208 independent of firewall 212.

Modifications, additions, or omissions may be made to method 400 without departing from the scope of the present disclosure. For example, the operations of method 400 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

For example, in some embodiments, the method 400 may further include establishing a secure network tunnel between the monitor system and the relay device over the communication channel on the secondary network, wherein the network communications of the one or more network vulnerability assessments pass through the secure network tunnel between the monitor system and the relay device.

In some embodiments, the method 400 may further include after establishing the communication channel and detecting the one or more devices, the method further comprises monitoring a network latency between the relay device and the monitor system across the secondary network. In these and other embodiments, the method 400 may further include modifying the one or more network vulnerability assessments based on the monitored network latency.

For example, with reference to FIG. 2, a first latency ("L1") between monitor system 202 and relay device 206 may be determined. Further, a second latency ("L2") between relay device 206 and a device under test (DUT) (e.g., device D1) of network 208 may be determined. Moreover, a total latency ("LT") may be determined (e.g., total latency LT=latency L1+latency L2). For example, monitor system 202 and/or relay device 206 may determine the first latency, and relay device 206 may determine the second latency. In these and other embodiments, monitor system 202 may adjust the network vulnerability assessments of the devices of network 208 based on the total latency LT.

In some embodiments, one or more latencies (e.g., between a monitor system and an authenticated device and/or between the authenticated device and a DUT) may be recalculated, and one or more network vulnerability assessments may be adjusted based on the one or more recalculated latencies. For example, in response to recalculation of one or more latencies, monitor system 202 may adjust the one or more network vulnerability assessments. Latencies may change (e.g., based on network conditions) and, therefore, one or more latencies may be recalculated periodically, in response to an event (e.g., a detected change in network conditions), upon request (e.g., from a user), etc.

Further, for example, results of one or more network vulnerability assessments may be reported, recorded, displayed (e.g., via a user interface or display 356 of FIG. 3), and/or provided to one or more users (e.g., a user of relay device 206, a user of a DUT, a system administrator, a third-party service provider, etc.). For example, in an embodiment wherein network 208 includes a corporate company network, a network vulnerability assessment report may be provided to the company periodically (e.g., daily, weekly, monthly, etc.). Further, in response to detection of one or more vulnerabilities, one or more actions may be taken. For example, a port may be closed, code revisions may be made, settings may be changed, software may be updated, patches may be installed, etc.

Figure 5:
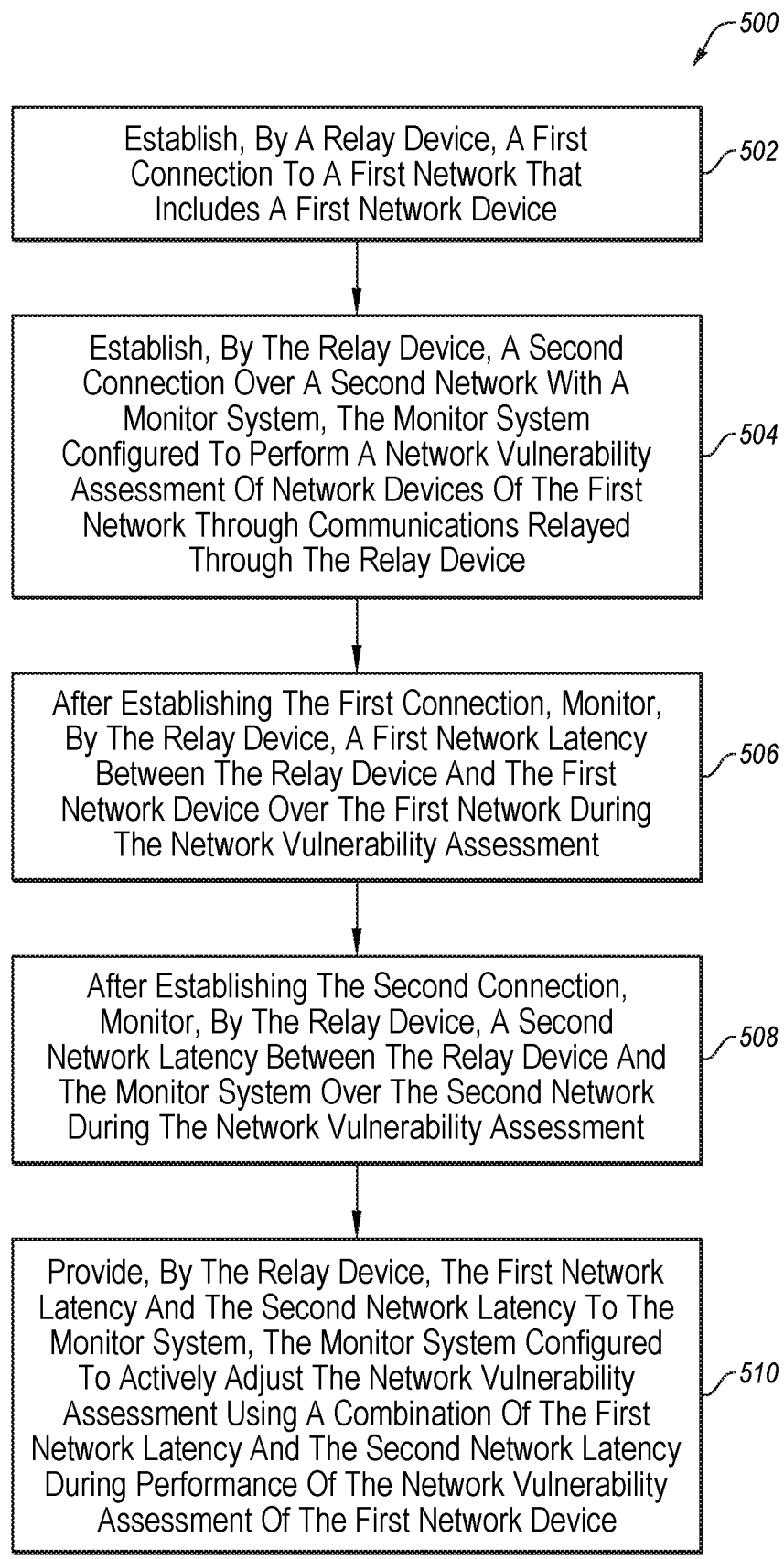
FIG. 5 is a flowchart of another example method to assess network vulnerabilities of devices.

FIG. 5 is a flowchart of an example method 500 to assess network vulnerabilities of devices. Method 500 may be arranged in accordance with at least one embodiment described in the present disclosure. Method 500 may be performed, in some embodiments, by a device or system, such as monitor system 102 and/or relay device 106 of FIG. 1, monitor system 202 and/or relay device 206 of FIG. 2, system 300 of FIG. 3, or another device. In these and other embodiments, method 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

Method 500 may begin at block 502, where a first connection to a first network that includes a first network device may be established by a relay device.

At block 504, a second connection over a second network may be established by a relay device with a monitor system. The monitor system may be configured to perform a network vulnerability assessment of network devices of the first network through communications relayed through the relay device. In some embodiments, the second network may be a mobile data network and the second network may be of a different network type than the first network.

At block 506, after establishing the first connection, a first network latency between the relay device and the first network device over the first network during the network vulnerability assessment may be monitored by the relay device.

At block 508, after establishing the second connection, a second network latency between the relay device and the monitor system over the second network during the network vulnerability assessment may be monitored by the relay device. In some embodiments, monitoring the first network latency and the monitoring the second network latency may occur in response to a request received at the relay device from the monitor system.

At block 510, the first network latency and the second network latency may be provided by the relay device to the monitor system. The monitor system may be configured to actively adjust the network vulnerability assessment using a combination of the first network latency and the second network latency during performance of the network vulnerability assessment of the first network device. In some embodiments, the active adjustment of the network vulnerability assessment by the monitor system may include adjusting a timing for determining a status of a port of the first network device.

Modifications, additions, or omissions may be made to method 500 without departing from the scope of the present disclosure. For example, the operations of method 500 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

For example, in some embodiments, the method 500 may further include in response to a change of the combination of the first network latency and the second network latency being greater than a change threshold, providing, by the relay device, an updated first network latency and an updated second network latency to the monitor system.

Alternatively or additionally, the method 500 may further include monitoring, by the relay device, a third network latency over the first network between the relay device and a second network device of the first network during the network vulnerability assessment. In these and other embodiments, the method 500 may further include providing, by the relay device, the third network latency to the monitor system, the monitor system configured to actively adjust the network vulnerability assessment using a combination of the third network latency and the second network latency during performance of the network vulnerability assessment of the second network device.

In some embodiments, a relay device may be disclosed. In these and other embodiments, the relay device may include one or more processors and one or more computer-readable media coupled to the one or more processors. The computer-readable media may be configured to store instructions that, when executed by one or more processors, are configured to cause the relay device to perform operations. The operations may include establish a first connection to a first network that includes a first network device and establish a second connection over a second network with a monitor system. The monitor system may be configured to perform a network vulnerability assessment of network devices of the first network through communications relayed through the relay device.

The operations may further include after establishing the first connection, obtain a first network latency between the relay device and the first network device over the first network and after establishing the second connection, obtain a second network latency between the relay device and the monitor system over the second network. The operations may further include providing the first network latency and the second network latency to the monitor system. The monitor system may be configured to adjust the network vulnerability assessment using the first network latency and the second network latency.

In some embodiments, the second network may be a mobile data network and the second network may be of a different network type than the first network. Alternatively or additionally, adjustment of the network vulnerability assessment by the monitor system may include adjusting a timing for determining a status of a port of the first network device. Alternatively or additionally, determination of the first network latency and determination of the second network latency may each occur in response to a request received from the monitor system. Alternatively or additionally, the operations of: determine the first network latency, determine the second network latency, and provide the first network latency and the second network latency to the monitor system may occur a plurality of times during performance of the network vulnerability assessment of the network devices. Alternatively or additionally, the operations of: determine the first network latency, determine the second network latency, and provide the first network latency and the second network latency to the monitor system may occur multiple times during performance of a network vulnerability assessment of the first network device.

In some embodiments, the operations may further include determine a third network latency between the relay device and the monitor system over the second network and providing the third network latency to the monitor system. The monitor system may be configured to adjust the network vulnerability assessment of a second network device of the first network using the first network latency and the third network latency.

In some embodiments, a monitor system may be disclosed. In these and other embodiments, the monitor system may include one or more processors and one or more computer-readable media coupled to the one or more processors. The computer-readable media may be configured to store instructions that, when executed by one or more processors, are configured to cause the monitor system to perform operations.

In some embodiments, the operations may include establish a first connection over a first network with a relay device and direct communications to a network device that is part of a second network through the relay device connected to the second network by way of the first network and the second network. The communications may be configured to assess network vulnerability of the network device. The operations may further include obtain a first network latency between the monitor system and the relay device over the first network and obtain a second network latency between the relay device and the network device over the second network. The operations may further include in response to obtaining the first network latency and the second network latency, adjust a network vulnerability assessment of the network device using the first network latency and the second network latency.

In some embodiments, the first network may be a mobile data network and the first network may be of a different network type than the second network. Alternatively or additionally, adjusting the network vulnerability assessment may include adjusting a timing for determining a status of a port of the network device.

In some embodiments, the operations may further include directing, to the relay device, a request for network latencies. In these and other embodiments, obtaining the first network latency and obtaining the second network latency may be in response to directing the request for the network latencies. Alternatively or additionally, the operations of: obtain the first network latency, obtain the second network latency, and adjust the network vulnerability assessment may occur multiple times during the network vulnerability assessment of the network device.

In some embodiments, the operations may further include obtain a third network latency between the relay device and the monitor system over the second network and adjust the network vulnerability assessment of a second network device of the second network using the second network latency and the third network latency.

As indicated above, the embodiments described herein may include the use of a special purpose or general purpose computer (e.g., processor 350 of FIG. 3) including various computer hardware or software modules, as discussed in greater detail below. Further, as indicated above, embodiments described herein may be implemented using computer-readable media (e.g., memory 352 of FIG. 3) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. A method comprising:
establishing, by a relay device, a first connection to a first network that includes a first network device;
establishing, by the relay device, a second connection over a second network with a monitor system, the monitor system configured to perform a network vulnerability assessment of network devices of the first network through communications relayed through the relay device;
after establishing the first connection, monitoring, by the relay device, a first network latency between the relay device and the first network device over the first network during the network vulnerability assessment;
after establishing the second connection, monitoring, by the relay device, a second network latency between the relay device and the monitor system over the second network during the network vulnerability assessment; and
providing, by the relay device, the first network latency and the second network latency to the monitor system, the monitor system configured to actively adjust the network vulnerability assessment using a combination of the first network latency and the second network latency during performance of the network vulnerability assessment of the first network device.

2. The method of claim 1, wherein the second network includes a mobile data network and the second network is a different network type than the first network.

3. The method of claim 1, wherein the monitoring the first network latency and the monitoring the second network latency occurs in response to a request received at the relay device from the monitor system.

4. The method of claim 1, wherein the active adjustment of the network vulnerability assessment by the monitor system includes adjusting a timing for determining a status of a port of the first network device.

5. The method of claim 1, further comprising in response to a change of the combination of the first network latency and the second network latency being greater than a change threshold, providing, by the relay device, an updated first network latency and an updated second network latency to the monitor system.

6. The method of claim 1, further comprising monitoring, by the relay device, a third network latency over the first network between the relay device and a second network device of the first network during the network vulnerability assessment.

7. The method of claim 6, further comprising providing, by the relay device, the third network latency to the monitor system, the monitor system configured to actively adjust the network vulnerability assessment using a combination of the third network latency and the second network latency during performance of the network vulnerability assessment of the second network device.

8. A relay device comprising:
at least one processor;
at least one non-transitory computer-readable media coupled to the at least one processor, the at least one non-transitory computer-readable media configured to store instructions that, when executed by the at least one processor, are configured to cause the relay device to perform operations comprising:
establish a first connection to a first network that includes a first network device;
after establishing the first connection, obtain a first network latency between the relay device and the first network device over the first network;
establish a second connection over a second network with a monitor system, the monitor system configured to perform a network vulnerability assessment of network devices of the first network through communications relayed through the relay device;
after establishing the second connection, obtain a second network latency between the relay device and the monitor system over the second network; and
provide the first network latency and the second network latency to the monitor system, the monitor system configured to adjust the network vulnerability assessment using the first network latency and the second network latency.

9. The relay device of claim 8, wherein the adjustment of the network vulnerability assessment by the monitor system includes adjusting a timing for determining a status of a port of the first network device.

10. The relay device of claim 8, wherein the obtain of the first network latency and the obtain of the second network latency each occurs in response to a request received from the monitor system.

11. The relay device of claim 8, wherein the obtain the first network latency, the obtain the second network latency, and the provide the first network latency and the second network latency to the monitor system occur a plurality of times during performance of the network vulnerability assessment of the network devices.

12. The relay device of claim 8, wherein the obtain the first network latency, the obtain the second network latency, and the provide the first network latency and the second network latency to the monitor system occur a plurality of times during performance of a network vulnerability assessment of the first network device.

13. The relay device of claim 8, wherein the adjustment of the network vulnerability assessment by the monitor system includes adjusting a timing for determining a status of a port of the first network device.

14. The relay device of claim 8, wherein the operations further comprise:
obtain a third network latency between the relay device and the monitor system over the second network; and
provide the third network latency to the monitor system, wherein the monitor system is configured to adjust the network vulnerability assessment of a second network device of the first network using the first network latency and the third network latency.

15. A monitor system comprising:
at least one non-transitory computer-readable media configured to store one or more instructions; and
at least one processor coupled to the at least one non-transitory computer-readable media, the at least one processor configured to execute the instructions to cause or direct the monitor system to perform operations, the operations comprising:
establish a first connection over a first network with a relay device;
direct communications to a network device, which is part of a second network, through the relay device connected to the second network by way of the first network and the second network, the communications configured to assess network vulnerability of the network device;
obtain a first network latency between the monitor system and the relay device over the first network;

obtain a second network latency between the relay device and the network device over the second network; and in response to obtaining the first network latency and the second network latency, adjust a network vulnerability assessment of the network device using the first network latency and the second network latency.

16. The monitor system of claim 15, wherein the first network includes a mobile data network and the first network is of a different network type than the second network.

17. The monitor system of claim 15, wherein the adjust the network vulnerability assessment includes adjusting a timing for determining a status of a port of the network device.

18. The monitor system of claim 15, wherein the operations further comprise direct, to the relay device, a request for network latencies, wherein the obtain the first network latency and the obtain the second network latency is in response to directing the request for the network latencies.

19. The monitor system of claim 15, wherein the obtain the first network latency, the obtain the second network latency, and the adjust the network vulnerability assessment occur a plurality of times during the network vulnerability assessment of the network device.

20. The monitor system of claim 15, wherein the operations further comprise:

obtain a third network latency between the relay device and the monitor system over the second network; and adjust the network vulnerability assessment of a second network device of the second network using the second network latency and the third network latency.

* * * * *